United States Patent [19]

Lee

[11] Patent Number: 4,901,183
[45] Date of Patent: Feb. 13, 1990

[54] SURGE PROTECTION DEVICE

[75] Inventor: Benny H. Lee, Sonoma, Calif.

[73] Assignee: World Products, Inc., Sonoma, Calif.

[21] Appl. No.: 237,745

[22] Filed: Aug. 29, 1988

[51] Int. Cl.$^4$ .............................................. H02H 9/00
[52] U.S. Cl. ........................................ 361/56; 361/91; 361/111
[58] Field of Search ...................... 361/56, 86, 91, 111, 361/117, 118, 119

[56] References Cited

U.S. PATENT DOCUMENTS

| | | | |
|---|---|---|---|
| 3,527,985 | 9/1970 | Brown | 361/56 |
| 3,737,725 | 6/1973 | Donnelly | 361/86 X |
| 3,777,219 | 12/1973 | Winters | 338/20 X |
| 3,934,175 | 1/1976 | Clark | 361/56 |
| 4,023,071 | 5/1977 | Fussell | 361/56 |
| 4,068,277 | 1/1978 | Simokat | 361/56 X |
| 4,068,279 | 1/1978 | Byrnes | 361/56 |
| 4,089,032 | 5/1978 | Orfano | 361/56 |
| 4,168,514 | 9/1979 | Howell | 361/56 |
| 4,191,985 | 3/1980 | Phillips, Jr. | 361/56 |
| 4,271,446 | 6/1981 | Comstock | 361/56 |
| 4,296,336 | 10/1981 | Skanadore | 351/13 |
| 4,325,097 | 4/1982 | Clark | 361/56 |
| 4,463,406 | 7/1984 | Sirel | 361/56 |
| 4,563,720 | 1/1986 | Clark | 361/56 |
| 4,584,622 | 4/1986 | Crosby et al. | 361/56 |
| 4,587,588 | 5/1986 | Goldstein | 361/56 X |
| 4,599,636 | 7/1986 | Roberts et al. | 357/76 |
| 4,600,960 | 7/1986 | Clark | 361/56 |
| 4,628,394 | 12/1986 | Crosby et al. | 361/56 |
| 4,675,772 | 6/1987 | Epstein | 361/91 X |
| 4,677,518 | 6/1987 | Hershfield | 361/56 |
| 4,698,721 | 10/1987 | Warren | 361/56 |
| 4,758,920 | 7/1988 | McCortney | 361/91 X |

FOREIGN PATENT DOCUMENTS 1485679  9/1977  United Kingdom .

OTHER PUBLICATIONS

"AC Power Line Protection for an IEEE 587 Class B Environment", by Roehr et al., *Product Data Book*, 1985 published by General Semiconductor Industries, Inc.

*Primary Examiner*—Derek S. Jennings
*Attorney, Agent, or Firm*—Merchant, Gould, Smith, Edell, Welter & Schmidt

[57] ABSTRACT

A surge or transient protection circuit is described which operates in an immediate fail-safe mode of failure. If an incoming transient exceeds the transient absorption capacity of the circuit, precision fast-blow fuses are immediately opened to remove current from the load to prevent damage to the equipment connected to the transient suppression circuit and to indicate to the user that the transient suppression abilities of this circuit have been damaged. The transient suppression circuit uses silicon transient voltage suppressor components to absorb the fast-rising edge of transients and also uses slower-acting MOV transient absorption devices for the bulk of the overvoltage transient power. Upon short-circuit failure of any of the suppressor components, the excessive current draw produced thereby results in blowing of the fast-blow fuses.

2 Claims, 1 Drawing Sheet

SURGE PROTECTION DEVICE

FIELD OF THE INVENTION

The present invention relates to power line protection devices and in particular to AC power line surge and transient protection, RFI, EMI and ESD protection devices.

BACKGROUND OF THE INVENTION

A wide variety of modern commercial and consumer electronics employ microchip technology which is particularly sensitive to power line transients or surges, RFI (radio frequency interference), EMI (electromagnetic interference) and ESD (electrostatic discharge). Such devices as computers, stereos, televisions, radios and the like can all be affected if not seriously damaged by unfiltered, unprotected or generally "dirty" AC power.

Of these four general types of power line disturbances, power surges or transients are by far the most damaging. These surges are found on power lines from a wide variety of sources, such as lightning, power company switching, collapsing electric fields when electric motors are shut down, surges when electric motors are started, sparking between power lines, arcing between opening and closing relay contacts, and the like. These voltage surges of 400 V or more can find their way into sensitive microchip technology electronics and damage or destroy circuitry. Thus, at a minimum, surge protection is extremely important for commercial or consumer electronics, and especially important for personal computing systems which can suffer data dropout and circuit failures in the presence of power line surges.

A wide variety of prior art surge or transient protection and surge or transient suppression devices are available for removing or dampening offending power line surges and transients in order to protect the consumer electronics connected thereto. May of these prior art transient or surge suppression devices are typically tested to specifications produced by, for example, the Institute of Electrical and Electronic Engineers (IEEE), Underwriters Laboratories (UL1449 and UL1283), the Federal Communications Commission (FCC) or the Consultant Committee, International Telegraph and Telephone (CCITT). The most common among these standards is the IEEE Standard 587 (ANSI C62.41-1981). The portion of this technical specification which applies to indoor applications describes transient conditions occurring in low voltage (less than 600 V) AC power circuits in which the transients exceed twice the peak operating voltage with durations ranging from a fraction of a microsecond to a millisecond and originating primarily from system switching and lightening effects. This standard has been promulgated to evaluate the survival capability of equipment connected to power circuits as described in UL1449. In testing against this standard, many of the prior art surge protection devices combine transient suppression components with additional components to perform RFI and EMI filtering which may also be required to comply with FCC standards.

To survive the impulse characteristics of IEEE 587-1981 for indoor applications and to meet the standards of UL1449 (and become listed by UL), prior art surge protection devices are typically designed to shunt the offending surge current and thus limit the over-voltage portion of the transient to the neutral or return line, thus creating a momentary low-impedance path between the power line and the return path. The clamping device must be designed to operate above a certain voltage threshold and must be capable of withstanding the current which is momentarily shunted to ground. Typical components used in prior art devices to clamp or limit the overvoltage portions of transients have been gas-filled spark gap surge arrestors, MOV's (metal oxide varistors) available from Sanken Electric, GE and other vendors, and silicon transient voltage suppressors such as the TVS 1.5KE series devices available from World Products Inc., the TransZorb ® transient voltage suppressor devices available from General Semiconductor Industries, Inc., and other vendors. These aforementioned shunt or clamping electronic devices are designed to withstand a plurality of overvoltage transients and safely shunt them to ground, thus protecting the device to which they are attached.

A problem with the prior art surge protection devices is when the shunt or clamp electronic components fail during repeated overvoltage transients. All of the aforementioned transient suppression devices can fail "open" (although they will momentarily fail "closed"), which in effect removes them from the circuit and leaves the power line and the devices connected thereto unprotected from subsequent power line surges. To remedy this situation, prior art power line surge protection devices have been designed such that a monitor light or LED indicator is used to indicate that the surge suppression devices are still operating properly. Should the power line surge protection devices fail, the indicator light will be extinguished, indicating to the user that the power line protection has been lost. A further problem with the prior art surge protection devices and their associated indicator lights is that the indicators are not always readily accessible or visible by the user. The surge protection devices are often located near a wall outlet or on the floor under a desk. The location of these suppressor devices inhibits the user or owner in identifying a failed condition on the surge or transient suppression device. Thus, protection may be lost and go unnoticed for quite some time, leaving the electronic equipment which is attached to the failed surge protector open to damage by power line surges.

To alleviate this problem, some prior art surge protection devices interrupt the power upon the failure of the transient suppression components. An example of a power line transient surge suppressor which interrupts power in this fashion is U.S. Pat. No. 4,587,588. The device described in this patent senses the failure of a transient suppression component and removes power from the load by using a thermal cutout which actuates within a few minutes of the failure of one of the surge suppression components of the device. However, the delay between the failure of a surge suppression device and the opening of the thermal cutout leaves the load vulnerable to a second and subsequent transient which may then damage the equipment connected to the transient suppression device.

There therefore is a need in the prior art for a transient or surge protection device which disconnects power from the load immediately upon the failure of any of the transient suppression components of the device.

SUMMARY OF THE INVENTION

To alleviate the problems of the prior art indicated above and to provide other advantages and benefits which will be readily recognized to those skilled in the art upon reading and understanding the present specification, the present invention describes a power line protection circuit which has an immediate fail-safe mode of operation. If the transient suppression electronic components within the present invention fail, they will fail shorted long enough to allow the entire circuit to interrupt power from the electronic components and equipment attached to the present invention immediately upon sensing the failure. In such a failure mode, the user is alerted to the failure of the surge protection devices due to the fact that the equipment is disconnected from the power line, thus preventing any damage to the equipment due to unfiltered transients or surges.

The preferred embodiment of the present invention described a three-line, four-stage surge protection device which also provides RFI and EMI filtering. The primary stage of the present invention consists of fast-line finely calibrated fuses connected between the power line and the remaining stages of the present invention. The second stage, connected in series with the first stage, consists of MOV devices to provide three-line heavy current surge protection in either common mode or differential mode. The third stage of the present invention is connected in series with the second stage and serves the double purpose of isolating the second and fourth stages of the present invention and providing RFI and EMI limiting through an LC combination forming a filter circuit. The fourth stage of the present invention is connected between the third stage and the electronic equipment which is to be protected, and consists of bidirectional silicon transient voltage suppression devices for high-speed clamping of the first rising edge of the incoming surge.

In operation, the present invention will sense and begin to clamp the wavefront of an incoming overvoltage transient through the bidirectional silicon clamp devices. The heavier portion of the current found later in time in the transient is then clamped by the slower reacting yet heavier current capacity MOV clamp devices. While both the silicon transient voltage suppression devices and MOV transient suppression devices are clamping an overvoltage condition, a high amount of instantaneous power is being shunted or diverted by the present invention. If this amount of power exceeds the capacity of any of the transient absorption components of the present invention, the finely calibrated fuses will open due to the increased current demand of the shorted MOV or shorted silicon transient voltage suppression (TVS) devices. The opening of one or more of the finely calibrated fuses will interrupt power from the power line and remove the electronic equipment from harm.

BRIEF DESCRIPTION OF THE DRAWING

The FIGURE shows the preferred embodiment of the present invention for a single-phase 120 VAC line surge suppressor application.

DETAILED DESCRIPTION OF THE PREFERRED EMBODIMENT

Figure 1:
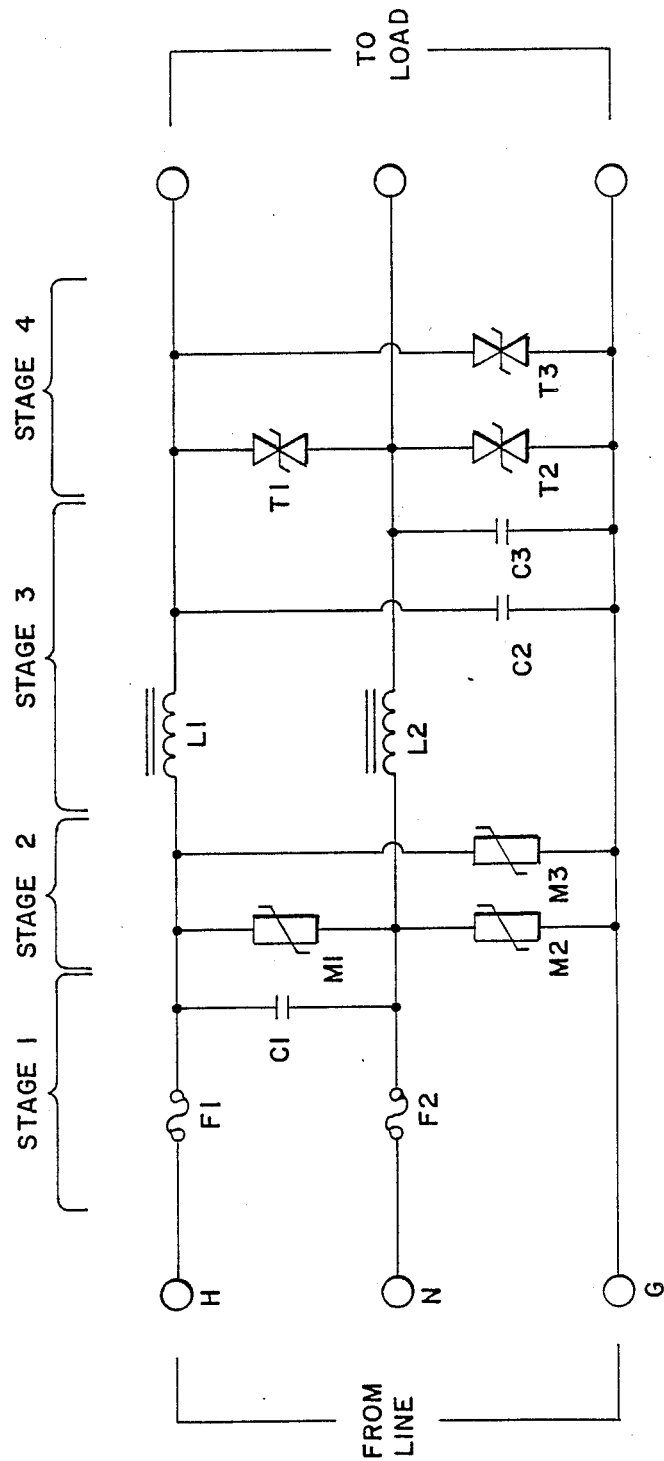

In the following detailed description of the preferred embodiment, reference is made to the accompanying drawing which forms a part hereof and in which is shown by way of illustration a specific embodiment in which the present invention may be practiced. This preferred embodiment is described in sufficient detail to enable those skilled in the art to practice the invention, and it is to be understood that other embodiments may be utilized and that structural or electrical changes may be made without departing from the spirit and scope of the present invention. The following detailed description is, therefore, not to be taken in a limiting sense, and the scope of the present invention is defined by the appended claims.

The preferred embodiment of the present invention is designed to be connected between an AC power line supplying, for example, 120-volt, 60-cycle current in the North American Standard, and a load which requires surge or transient protection, such as computer equipment. The line connection is shown to the left of the FIGURE, with the load connection shown to the right. The line connection designated H refers to the hot side of a 120 V single-phase circuit, while the N stands for the neutral or return current path. The line connector designated G is for the earth or ground connection. Stage 1 of the surge protector circuit is comprised of fuses F1, F2 and capacitor C1. Capacitor C1 is used for the reduction of common mode noise between the hot and neutral lines and serves to slow the fast rise of an incoming transient. Capacitor C1 is in the preferred embodiment a safety rated RFI capacitor having a value of 0.1 microfarad.

The fuses selected in the preferred embodiment of the present invention are fast-blow, high precision fuses rated at 12.0 Amperes available from Schurter, Inc. of Petaluma, Calif., part No. 001.1016, the amperage selected based upon the requirements of the user. These fuses are designed to have a precise current fusing point in response to near-instantaneous (less than or equal to 20 milliseconds) overcurrent conditions produced by the shorting of the TVS or MOV to provide a serial fail-safe OPEN. The fuses are designed to open in the event of excess current being shunted by any of the parallel protection components of the later stages. The fuses are designed to be internal to the circuit and not replaceable by the user. External fuses or circuit breakers at a similar or lower rating of fuses F1, F2 would be used for moderate over-current protection such as a short circuit on the load side or a constant overcurrent draw on the load side. Should a user of the present invention be allowed to replace fuses F1, F2, chances are that the incorrect size and type of fuse may be used, making the present circuit ineffective for protecting the components connected to the load. Since the TVS devices fail shorted, the replacement fuses for F1, F2 would blow OPEN again until the shorted TVS device was replaced. For this reason, the fuses are contained inside a cabinet inaccessible to the outside and the circuit must be repaired or replaced by an authorized repair service person.

Stage two protection of the present invention consists of MOV (Metal Oxide Varistor) components M1, M2 and M3. M1 is connected between the hot and neutral lines, M2 is connected between the neutral and ground lines, and M3 is connected between the hot and ground lines. This provides three-line protection for transient suppression from a transient between any two of the three lines. MOV devices are classified as nonlinear resistors or voltage dependent resistors. The MOV device is a sintered ceramic material between two conductors consisting of zinc oxide as a primary ingredient along with several other metal oxide additives. The clamping time of an MOV device is typically in the 20-nanosecond range. The clamping voltage is selected by the construction of the device for a fixed amount of current. At increasing levels of current, the clamping voltage of an MOV increases. The MOV devices used in the preferred embodiment of the present invention are designed for diverting large amounts of current and carrying the brunt of force behind an incoming transient. They are, in the preferred embodiment, part No. SNRA-130K20 available from World Products, Inc. of Sonoma, Calif., and are selected to have a nominal operating voltage of 130 volts RMS.

Stage three of the present invention shown in the Figure consists of inductors L1 and L2 and capacitors C2 and C3. The inductors and capacitors form an LC filter circuit to provide EMI and RFI protection while isolating stage two from stage four of the FIGURE. The inductors L1, L2 also serve as delay line or isolation devices when the present invention is subjected to a transient. The inductors serve to delay the full current so the TVS devices T1–T3 clamp only a limited amount of current corresponding to the oncoming wavefront of the transient. Approximately 20 nS after the TVS devices conduct to divert current, the MOV will begin conducting to shunt the remainder of the transient wave. In the preferred embodiment, inductors L1 and L2 are 91-microhenry inductors formed by winding 31 turns of 13 AWG wire on a powdered iron core, part No. T157-40 available from Micro Metal of San Diego, Calif. Capacitors C2 and C3 are in the preferred embodiment 0.0022-microfarad.

Stage four of the present invention shown in the Figure consists of silicon transient voltage suppressors T1, T2 and T3, which in the preferred embodiment are TVS (transient voltage suppression) diode devices also available from World Products, Inc. TVS device T1 is connected between the hot and neutral lines, T2 is connected between the neutral and ground lines, and T3 is connected between the hot and ground lines. This provides additional three-line protection for transient suppression for a transient between any two of the three lines.

The silicon transient suppressors such as the TVS type are characterized by their sharp avalanche characteristics, high surge handling capabilities and sub-nanosecond response time to transients. These types of transient suppression devices can handle the leading edge of a fast-rising surge to clamp the front of that surge to a ground or return path. Devices T1–T3, however, cannot divert as high a current capacity as that of MOV devices M1–M3 (which are slower reacting but can divert higher currents without destruction). In the preferred embodiment of the present invention, the transient voltage suppression devices T1–T3 are 200-volt breakdown devices, while the MOV devices are 130-volt RMS breakdown. Devices T1–T3 in the preferred embodiment are part No. 1.5KE200CA available from World Products, Inc. and other second-source vendors. The output of stage four is connected to the load device which requires surge protection.

In operation, an incoming transient between any two of the three lines on the LINE side of the FIGURE enters the circuit through fuses F1 or F2 or both. The leading edge of a fast-rising transient will be damped somewhat by the absorbing capacity of capacitor C1. Very fast pulse edges may pass beyond capacitor C1 and are attenuated and delayed by inductors L1 or L2 or both. Some of these very fast pulse edges, however, may pass inductors L1 or L2 due to parasitic stray capacitances and find their way to stage four of the circuit. In this stage, silicon transient voltage suppressor devices T1–T3 react in a sub-nanosecond time to absorb the leading edges of any transients. Thus, transient voltage suppression devices T1–T3 are the first clamp or shunt devices to conduct the leading wavefront of the transient.

Silicon transient voltage suppression devices T1–T3 cannot in all cases divert all the power of an incoming transient. Shortly after the clamp devices of stage four begin conducting (typically 20 nS), the MOV devices of stage two will begin conducting to clamp the majority of the incoming current of the overvoltage transient. If, however, the voltage transient contains sufficient power to exceed the capacities of the shunt or clamp devices of either stage two or four, the MOV or TVS devices will fail in a shorted condition which in turn will cause an instantaneous or near-instantaneous current rise through the fuses of stage one. If the current exceeds the rated value of fuses F1 or F2, one or the other of the fuses will open, quickly interrupting power to the load. In this fashion, the load is protected from transients which have the capacity to exceed the transient absorption capacity of the surge protection circuit of the FIGURE shown. Since the fuses F1, F2 interrupt power immediately upon failure of any of the MOV or TVS devices, second or subsequent transients following closely behind the first transient will not pass to the equipment connected to the LOAD side of the present invention.

Those skilled in the art will readily recognize that the capacitive elements are interchangeable in their position and the order is not intended to be limiting. The selection of the components of the preferred embodiment is intended to construct a device which conforms to the UL1449 standard and is rated for 15 A max (or other current ratings) at 50–400 Hz steady state current.

While the present invention has been described in connection with the preferred embodiment thereof, it will be understood that many modifications, such as the use of circuit breakers, manual ON/OFF switches, power indicators, failure indicators and the like, will be readily apparent to those of ordinary skill in the art, and this application is intended to cover any adaptations or variations thereof. Therefore, it is manifestly intended that this invention be limited only by the claims and the equivalents thereof.

What is claimed is:

1. A fail-safe voltage surge protection circuit for transient protection of AC lines, comprising:
   input means having a hot line, a neutral line and a ground line for receiving power from an AC supply line;
   output means having a hot line, a neutral line and a ground line for supplying said power to a load;
   a first MOV connected between the hot line and neutral line of said input means, a second MOV connected between the neutral line and the ground line of said input means and a third MOV connected between the hot line and the ground line of the input means;
   a first silicon transient suppressor connected between the hot line and neutral line of said output means, a second silicon transient suppressor connected between the neutral line and the ground line of said output means and a third silicon transient suppressor connected between the hot line and the ground line of the output means;
a first inductor connected between the hot line of said input means and the hot line of said output means, and a second inductor connected between the neutral line of said input means and the neutral line of said output means; first fuse means having a response time of less than 20 milliseconds at a precise current level connected in series in said hot line of said input means for fail-safe removal of said power from said load if any of said first MOV, third MOV, first silicon transient suppressor or third silicon transient suppressor fail shorted;
second fuse means having a response time of less than 20 milliseconds at a precise current level connected in series in said neutral line of said input means for fail-safe removal of said power from said load if any of said first MOV, second MOV, first silicon transient suppressor or second silicon transient suppressor fail shorted; and
said ground line of said input means connected to said ground line of said output means.

2. A fail-safe voltage surge protection circuit for transient protection of AC lines, comprising:
input means having a hot line, a neutral line and a ground line for receiving power from an AC supply line;
output means having a hot line, a neutral line and a ground line for supplying said power to a load;
a first MOV connected between the hot line and neutral line of said input means, a second MOV connected between the neutral line and the ground line of said input means and a third MOV connected between the hot line and the ground line of the input means;
a first silicon transient suppressor connected between the hot line and neutral line of said output means, a second silicon transient suppressor connected between the neutral line and the ground line of said output means and a third silicon transient suppressor connected between the hot line and the ground line of the output means;
a first inductor connected between the hot line of said input means and the hot line of said output means, and a second inductor connected between the neutral line of said input means and the neutral line of said output means;
fuse means having a response time of less than 20 milliseconds at a precise current level connected in series in said hot line of said input means for fail-safe removal of said power from said load if any of said first MOV, third MOV, first silicon transient suppressor or third silicon transient suppressor fail shorted; and
said ground line of said input means connected to said ground line of said output means.

* * * * *

UNITED STATES PATENT AND TRADEMARK OFFICE
CERTIFICATE OF CORRECTION

PATENT NO.   :  4,901,183

DATED        :  February 13, 1990

INVENTOR(S)  :  Benny H. Lee

It is certified that error appears in the above-identified patent and that said Letters Patent is hereby corrected as shown below:

Col. 1, line 40
   "May" should be --Many--

Col. 3, line 24
   "line" should be --blow--

Signed and Sealed this

Eighth Day of October, 1991

Attest:

HARRY F. MANBECK, JR.

Attesting Officer

Commissioner of Patents and Trademarks